United States Patent [19]
Horwath

[11] 3,938,385
[45] Feb. 17, 1976

[54] DISTRIBUTED TEMPERATURE SENSOR

[75] Inventor: Tibor G. Horwath, San Diego, Calif.

[73] Assignee: The United States of America as represented by the Secretary of the Navy, Washington, D.C.

[22] Filed: May 24, 1974

[21] Appl. No.: 473,251

[52] U.S. Cl............. 73/342; 73/362 R; 324/58.5 B
[51] Int. Cl.².. G01K 1/02; G01K 3/00; G01K 7/00; G01R 27/04
[58] Field of Search 73/339 R, 342, 362 R, 362 CP; 324/58.5 R, 58.5 B

[56] References Cited
UNITED STATES PATENTS

| | | | |
|---|---|---|---|
| 2,615,973 | 10/1952 | Heath | 73/362 CP X |
| 3,211,002 | 10/1965 | Franklin | 73/362 CP |
| 3,510,762 | 5/1970 | Leslie | 73/342 X |

OTHER PUBLICATIONS

Bottreau, A. et al., Realization of a Reflecto–Interferometer for Determination of the Complex Permittivity of Liquids . . . ., in C. R. Hebd. Seances Acad. Sci. B. (France), Vol. 276, No. 7, Feb. 12, 1973, pp. 255–257.

Primary Examiner—Richard C. Queisser
Assistant Examiner—Frederick Shoon
Attorney, Agent, or Firm—Richard S. Sciascia; Ervin F. Johnston; John Stan

[57] ABSTRACT

A distributed temperature sensor, in the form of a co-axial cable terminated in its characteristic impedance, comprising: an inner metallic conductor; a cylindrical, flexible, nonconductive material, surrounding the metallic conductor, having a plurality of axial voids extending throughout the length of the cable; a temperature-sensitive dielectric filling the axial voids, the voids being plugged at each end; an outer conductor surrounding the nonconductive material; and an optional elastomeric jacket surrounding the outer conductor.

The invention also relates to apparatus for taking a continuous readout of a distributed temperature field, using the coaxial cable as a key element.

6 Claims, 3 Drawing Figures

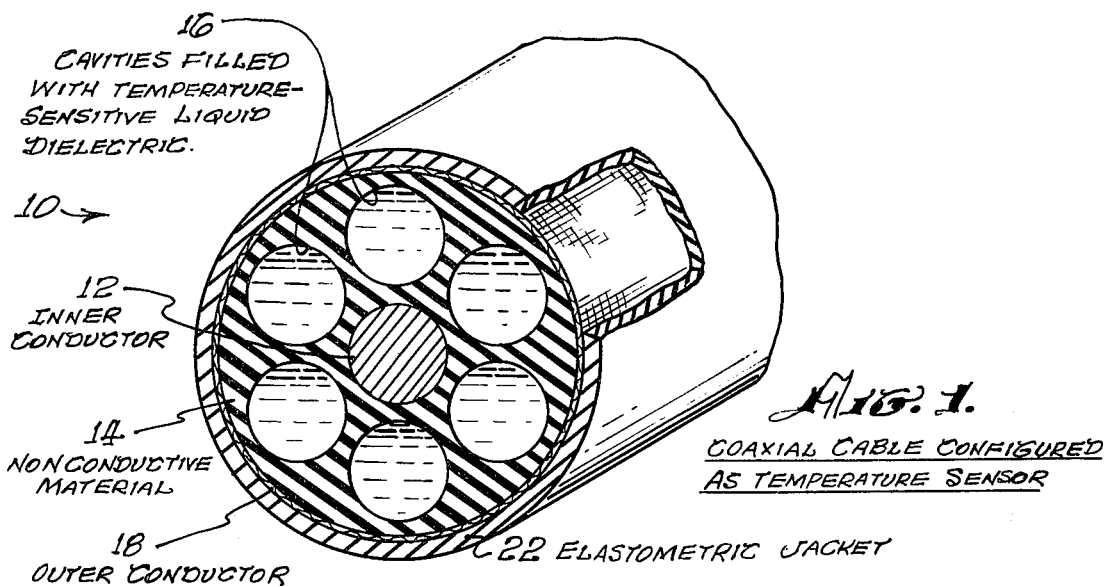
Fig. 1. Coaxial Cable Configured as Temperature Sensor
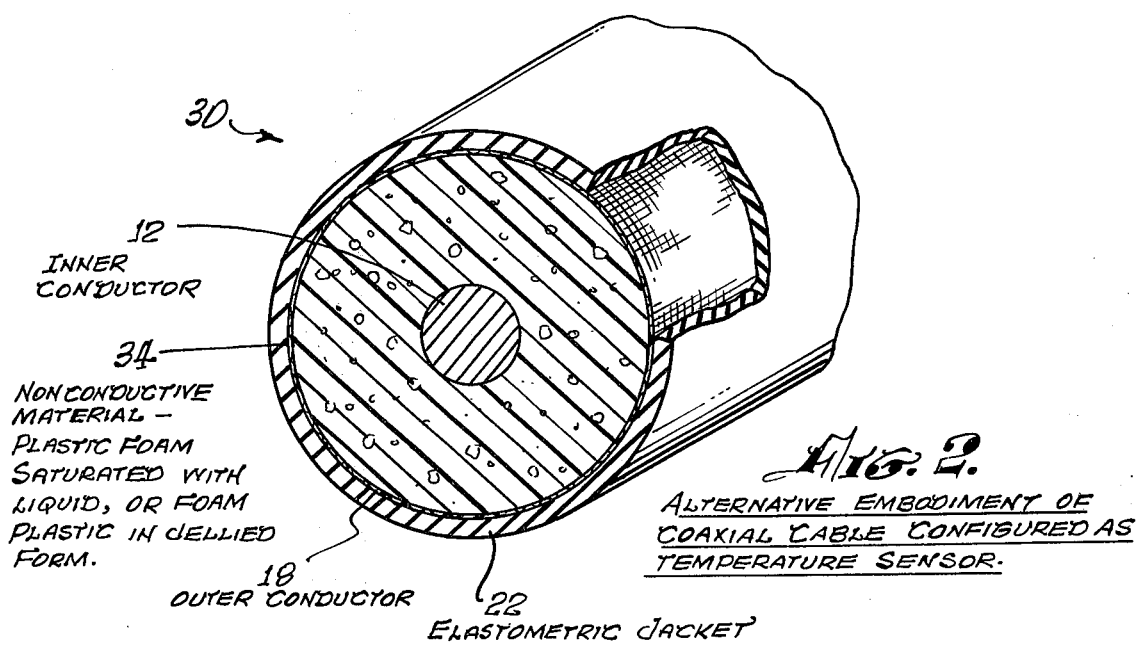
Fig. 2. Alternative Embodiment of Coaxial Cable Configured as Temperature Sensor.
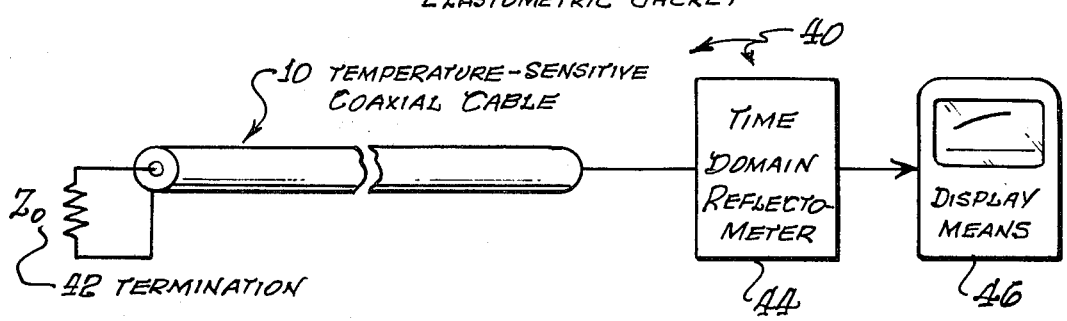
Fig. 3. Apparatus for Determining Temperature Profiles of Ocean

DISTRIBUTED TEMPERATURE SENSOR

Statement of Government Interest

The invention described herein may be manufactured and used by or for the Government of the United States of America for governmental purposes without the payment of any royalties thereon or therefor.

BACKGROUND OF THE INVENTION

1. Field of the Invention

This invention relates to a simple, inexpensive, apparatus for taking a continuous readout of a distributed temperature field. An example of such a temperature field is the temperature profile of the ocean. The apparatus lends itself readily to use on stationary and moving platforms, operating on the surface or submerged.

The construction of the distributed temperature sensor is based on an electromagnetic transmission line, in the form of a coaxial cable. Such a transmission line exhibits a characteristic impedance $Z_0$ for electromagnetic signals that is dependent on the transversal dimensions of the conductors and also on the electromagnetic properties of the insulating material between the two conductors, such as the dielectric constant $\epsilon$ and the permeability $\mu$. If these electromagnetic properties are temperature-dependent and the transmission line is immersed into a medium with spatially varying temperatures, the characteristic impedance of the transmission line will undergo local variations. These variations can be detected and localized with a time domain reflectometer.

2. Description of the Prior Art

Currently there are two principal devices in use for recording temperature profiles of the ocean.

The first is the bathythermograph. It is part of the standard equipment of most commercial and naval platforms. Its mode of operation is so widely known that a detailed description is not considered to be necessary. The device is expendable and is capable of providing a single temperature profile plot at a time.

The second prior art device is the thermistor chain. Its use is considerably less widespread than that of the bathythermograph, mainly because of its higher degree of complexity, greater cost and substantial difficulties in handling and maintenance. It consists of a large number of closely spaced electrical temperature sensors (thermistors) mounted on a steel chain that is trailed behind a moving platform. A heavy weight at the lower end holds the chain in a nearly vertical position while the towing platform is in motion. The electrical signals of the individual temperature sensors are either hardwired or telemetered to a processing system on board the platform. Because of its weight, length, bulkiness and relative fragility, it requires heavy winch equipment as well as utmost care in handling during deployment, towing, and recovery operations.

In contrast to the bathythermograph, the thermistor chain is capable of providing a continuous readout of the temperature profile. If required, however, this can be approximated by the bathythermograph at the cost of expending a large number of probes in sequence. If continuous readout of the temperature profile or a close approximation of it is the requirement, the cost will be high and the procedure complicated with both prior art devices.

One of the main advantages of the invention is that it provides a continuous readout of a temperature field with a device substantially less complicated than conventional devices used for measuring temperature profiles in the ocean. It can accomplish the same test for several orders of magnitude less cost. Because of the cable's inherently strong construction, it requires neither delicate handling nor extensive maintenance.

SUMMARY OF THE INVENTION

The invention relates to a temperature-sensitive coaxial cable. The inner and outer conductors are similar to those of conventional coaxial cables. A solid, but flexible, isolator with tubular cavities is interposed between the inner and outer conductor. The cavities contain the temperature-sensitive liquid dielectric. If the cross-sectional area of the tubular cavities is larger than that of the solid isolator, the composite dielectric constant will be essentially that of the liquid dielectric.

In a more complicated embodiment of the invention, an electromagnetic transmission line, such as a coaxial cable, is connected to a time domain reflectometer, which, in turn, is connected to a display means, such as a cathode ray tube display.

The coaxial cable has a characteristic impedance $Z_0$ for electromagnetic signals, defined by its dimensions and material constants according to the equation $$Z_0 = \frac{1}{2\pi} \left(\frac{\mu}{\epsilon}\right)^{1/2} \ln \frac{D_o}{D_i} \quad (1)$$

where $D_o$ is the radius of the outer conductor, $D_i$ that of the inner conductor, and $\epsilon$ is the dielectric constant, and $\mu$ is the permeability, of the isolating material. The characteristic impedance $Z_0$ is defined by Eq. (1) at a given location along the coaxial cable. The time-domain reflectometer connected to the coaxial cable detects the local characterisitic impedance and displays it as a function of cable length measured from the connecting terminals.

The characteristic impedance $Z_0$ will vary locally if any one of the parameters $D_o$, $D_i$, $\epsilon$, and $\mu$, or combinations of them undergo variations. For instance, if the dielectric constant $\epsilon$ is dependent on temperature, the local characteristic impedance will be a function of the local temperature of the coaxial cable, and the display of the characteristic impedance versus cable length will be related to the temperature field along the coaxial cable.

The temperature dependence of the dielectric constant $\epsilon$ of the isolating material in the cable must be strong. The effect on the characteristic impedance $Z_0$ due to it must be large compared with those due to changes of $D_o$ and $D_i$, if high temperature-reading accuracy is to be obtained.

A strong dependence of the dielectric constant $\epsilon$ on temperature is exhibited by liquid dielectrics with polarized molecules. Distilled water, most hydrocarbons, and a great number of other organic liquids fall into this category. The selection of the liquid dielectric has to be made with the object in view of minimization of dielectric losses.

OBJECTS OF THE INVENTION

An object of the invention is to provide an apparatus which can take a continuous readout of a temperature field.

Another object is to provide such an apparatus which is less complex, and easier to handle and maintain than similar prior art devices.

Yet another object of the invention is to provide such an apparatus, which, because of its use of a coaxial cable, is more rugged in construction than prior art devices.

Still another object of the invention is to provide an apparatus which can take a continuous readout of a temperature field at a cost several orders of magnitude less than prior art devices.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a diagrammatic view of the coaxial cable of this invention, used as a temperature sensor.

FIG. 2 is another embodiment of the coaxial cable used as a temperature sensor.

FIG. 3 is a partially diagrammatic and partially schematic view of the apparatus for determining temperature profiles of the ocean.

DESCRIPTION OF THE PREFERRED EMBODIMENTS

Referring now to the figures, and beginning with FIG. 1, this figure shows a distributed temperature sensor, in the form of a coaxial cable 10, comprising an inner metallic conductor 12, and a cylindrical, flexible, nonconductive material 14, surrounding the metallic conductor, and having a plurality of axial voids 16 extending throughout the length of the cable 10. A temperature-sensitive dielectric, also shown by reference numeral 16, fills the axial voids, the voids being plugged at each end of the cable 10. An outer conductor 18 surrounds the nonconductive material 14, while an optional elastomeric jacket 22 surrounds the outer conductor.

In the coaxial cable 10, serving as a distributed temperature sensor, the inner metallic conductor 12 may comprise copper, the nonconductive material 14 may be polyethylene, the dielectric 16 may be distilled water, the outer conductor 18 also may be braided copper, and, finally, the elastomeric jacket 22 may be vinyl.

The cable 10 is a special coaxial cable having tubular voids or cavities 16 extending the full length of the cable. Into these voids in injected a special liquid, a temperature-sensitive dielectric, having a high index of refraction. The ordinary coaxial cable is so constructed as to be temperature-in-sensitive.

The voids 16 in the cable 10 extend the full length of the cable. The voids are generally filled with a liquid dielectric because it is primarily liquids which exhibit a strong change in the dielectric constant with a relatively small change in the temperature.

The voids 16 could be randomly distributed along the length of the cable and filled with the liquid dielectric. The objective is to get a sufficient amount of the temperature-sensitive liquid into the cable.

Distilled water is a very suitable liquid, because of its high ratio of change in dielectric constant (index of refraction) to change in temperature. There are some hydrocarbons also having this property.

There are two different types of liquid dielectrics: (1) the non-polar liquids, where the molecules do not have a permanent dipole moment, which do not undergo a significant change in dielectric constant with a change in temperature; and (2) liquids which have a fairly strong dipole moment.

The following takes place when a polarized liquid is placed in a strong electric field. The electric field attempts to orient the molecules in the direction of the electric field. However, the thermal agitation of the molecules counteracts this action. The higher the temperature, the greater the agitation of the molecules.

For distilled water, between a temperature of 0°C and 40°C, there is a 70% change in the dielectric constant.

Accordingly, FIG. 2 shows another embodiment of a distributed temperature sensor, in the form of a coaxial cable 30, comprising a central, metallic, conductor 12, and a cylindrical, flexible, nonconductive material 34, surrounding the conductor, which itself comprises a plastic foam isolator, having voids interspersed throughout its volume, and a liquid dielectric having a high ratio of dielectric constant to change in temperature filling the voids of the isolator. An outer conductor 18 surrounds the nonconductive material 34. An optional elastomeric jacket 22 may surround the outer conductor 18. In the distributed temperature sensor 30, typically, the foam isolator 34 may be polyethylene, and the liquid dielectric may be distilled water.

Several other variations are possible in the construction of the cable 30. The nonconductive material 34 shown in FIG. 2 can be replaced by any configuration that prevents radial motion of the inner conductor 12. The main consideration is to maximize the liquid dielectric content without making the cable 30 susceptible to easy deformation. An alternative to the arrangement described in FIG. 2 would be a liquid contained by the foam plastic in jellied form, without losing temperature-sensitive characteristics.

Referring now to FIG. 3, this figure shows an apparatus 40 for taking a continuous readout of a distributed temperature field, such as the temperature profile of the ocean, comprising the coaxial cable, 10 of FIG. 1 or 30 of FIG. 2, terminated in its characteristic impedance $Z_0$, shown by reference numeral 42. A time-domain reflectometer 44 has its input connected to the unterminated end of the coaxial cable 10. Display means 46 are utilized, whose input is connected to the output of the reflectometer 44, for displaying the output of the reflectometer, with the result that the reflected signals from the cable are displayed on the display means as a function of the temperature profile along the cable. The displaying means 46 may be a cathode-ray tube or a pen chart recorder.

The time domain reflectometer 44 is not the exclusive, but probably the simplest readout system. A great number of signal processing and display devices can be envisioned based on the principle of applying a short electromagnetic pulse to the cable and receiving and resolving the signals returned from the regions of varying characteristic impedance.

This invention is also applicable to optical embodiments using a tube, for example of a flexible plastic, filled with an optically clear material, such as distilled water, or optical fibers may be used. Preferably the transparent material used would have a higher index of refraction, so as to have as great a variation in the intensity of the returned light as possible.

The theoretical basis of the invention is detailed hereinbelow:

The characteristic impedance a coaxial cable exhibits to electromagnetic signals applied to its terminals can be determined from the equation:

$$Z = \frac{1}{2\pi} \left(\frac{\mu}{\epsilon}\right)^{1/2} \ln \frac{D_o}{D_i}, \qquad (2)$$

where $D_o$ and $D_i$ represent the diameters of the outer and inner conductor respectively, and $\mu$ and $\epsilon$ represent the electromagnetic parameters of the cable, the permeability and dielectric constant of the insulator.

If the permeability $\mu$ and the dielectric constant $\epsilon$ change along the axis of the coaxial cable, which can be designated the direction of the $x$-coordinate, and if they change with temperature $\theta(x)$, which in turn depends on $x$, equation (2) has to be written:

$$Z[x, \theta(x)] = \frac{1}{2\pi} \left\{ \frac{\mu[x, \theta(x)]}{\epsilon[x, \theta(x)]} \right\}^{1/2} \ln \frac{D_o}{D_i} \qquad (3)$$

Further, the means permeability $\bar{\mu}$ and mean dielectric constant $\bar{\epsilon}$, averaged over the length of the cable $L = x_2 - x_1$ can be defined as $$\bar{\mu} = \frac{1}{x_2 - x_1} \int_{x_1}^{x_2} \mu(x, \bar{\theta}) dx \qquad (4)$$

and $$\bar{\epsilon} = \frac{1}{x_2 - x_1} \int_{x_1}^{x_2} \epsilon(x, \bar{\theta}) dx \qquad (5)$$

and consequently, because of small variations of $\mu[x, \theta(x)]$ and $\epsilon[x, \theta(x)]$, the mean characteristic impedance can be approximated as $$\bar{Z} \approx \frac{1}{x_2 - x_1} \int_{x_1}^{x_2} Z(x, \theta) dx \qquad (6)$$

The parameter $\bar{\theta}$, which is the mean temperature over the cable length, equals $$\bar{\theta} = \frac{1}{x_2 - x_1} \int_{x_1}^{x_2} \theta(x) dx \qquad (7)$$

If the diameters of the inner and outer conductor of the cable, $D_o$ and $D_i$ respectively, exhibit only insignificant changes along the cable axis, variations of the local characteristic impedance will be mainly due to changes of the permeability, $\mu[x, \theta(x)]$ and the dielectric constant $\epsilon[x, \theta(x)]$ of the insulator, according to the equation:

$$dZ[x, \theta(x)] = \frac{\delta Z[x, \theta(x)]}{\delta \mu[x, \theta(x)]} d\mu[x, \theta(x)] + \frac{\delta Z[x, \theta(x)]}{\delta \epsilon[x, \theta(x)]} d\epsilon[x, \theta(x)] \qquad (8)$$

Using equation (3), this becomes $$dZ[x, \theta(x)] = \frac{1}{4\pi} \left\{ \frac{\mu[x, \theta(x)]}{\epsilon[x, \theta(x)]} \right\}^{1/2} \ln \frac{D_o}{D_i}$$

—continued $$\left\{ \frac{d\mu[x, \theta(x)]}{\mu[x, \theta(x)]} - \frac{d\epsilon[x, \theta(x)]}{\epsilon[x, \theta(x)]} \right\} \qquad (9)$$

or by substituting the mean values from equations (4), (5), and (6)

$$\frac{dZ[x, \theta(x)]}{Z} = \frac{1}{2} \left\{ \frac{d\mu[x, \theta(x)]}{\bar{\mu}} - \frac{d\epsilon[x, \theta(x)]}{\bar{\epsilon}} \right\} \qquad (10)$$

The changes of permeability and dielectric constant can be further expanded. They become $$d\mu[x, \theta(x)] = \frac{\delta \mu[x, \theta(x)]}{\delta x} dx + \frac{\delta \mu[x, \theta(x)]}{\delta \theta(x)} d\theta(x) \qquad (11)$$

$$d\epsilon[x, \theta(x)] = \frac{\delta \epsilon[x, \theta(x)]}{\delta x} dx + \frac{\delta \epsilon[x, \theta(x)]}{\delta \theta(x)} d\theta(x) \qquad (12)$$

The first term on the right side of equations (11) and (12) represents the spatial dependence. These terms can be discounted, because of the spatially uniform insulator inside the cable, so that the changes are mainly due to temperature. However, these terms could become important if quality control tests of spatial and production uniformity show inconsistencies due to dimension or property variations. Equations (11) and (12) then become $$d\mu[\theta(x)] = \frac{\delta \mu[\theta(x)]}{\delta \theta(x)} d\theta(x) \qquad (13)$$

and $$d\epsilon[\theta(x)] = \frac{\delta \epsilon[\theta(x)]}{\delta \theta(x)} d\theta(x) \qquad (14)$$

Substituting these into equation (10) yields $$\frac{dZ[\theta(x)]}{Z} = \frac{1}{2\bar{\mu}} \frac{\delta \mu[\theta(x)]}{\delta \mu(x)} d\theta(x) + \frac{1}{2\bar{\epsilon}} \frac{\delta \epsilon[\theta(x)]}{\delta \theta(x)} d\theta(x) \qquad (15)$$

defining $$\mu_o = \frac{1}{\bar{\mu}} \frac{\delta \mu[\theta(x)]}{\delta \theta(x)} \qquad (16)$$

and $$\epsilon_o = \frac{1}{\bar{\epsilon}} \frac{\delta \epsilon[\theta(x)]}{\delta \theta(x)} \qquad (17)$$

representing the normalized changes of permeability and dielectric constant respectively, per unit temperature changes. Using these terms, equation (15) becomes $$\frac{dZ[\theta(x)]}{Z} = \frac{1}{2} \mu_o \, d\theta(x) - \frac{1}{2} \epsilon_o \, d\theta(x), \qquad (18)$$

representing the local normalized change of characteristic impedance Z as a function of local temperature.

These normalized changes of the characteristic impedance along the coaxial cable cause scattering of electromagnetic signals propagating in the cable. The relative amplitude of the scattered signals is described by the local voltage reflection coefficients, $\rho[\theta(x)]$, which are proportional to the normalized characteristic impedance changes and hence are also a function of temperature, thus, $$\rho[\theta(x)] = \frac{1}{2} \frac{Z[\theta(x)]}{Z} \qquad (19)$$

which leads directly to $$\rho[\theta(x)] = \tfrac{1}{4}\mu_o d\theta(x) - \tfrac{1}{4}\epsilon_o d\theta(x) \qquad (20)$$

This is the quantity measured by the time domain reflectometer.

Obviously many modifications and variations of the present invention are possible in the light of the above teachings. It is therefore to be understood that within the scope of the appended claims the invention may be practiced otherwise than as specifically described.

What is claimed is:

1. A distributed temperature sensor, in the form of a coaxial cable, comprising:
   a central, metallic, conductor;
   a cylindrical, flexible, nonconductive, material, surrounding the material, comprising:
   a plastic foam isolator, having voids randomly interspersed throughout its volume; and
   a liquid dielectric having a high ratio of dielectric constant to change in temperature, filling the voids of the isolator; and
   an outer conductor surrounding the nonconductive material.

2. The distributed temperature sensor according to claim 1, further comprising:
   an elastomeric jacket surrounding the outer conductor.

3. The distributed temperature sensor according to claim 2, wherein
   the foam isolator is polyethylene; and the liquid dielectric is distilled water.

4. Method for taking a continuous readout of a distributed temperature field, such as the temperature profile of the ocean, comprising the steps of:
   terminating the coaxial cable having a configuration according to claim 1 in its characteristic impedance;
   connecting a time-domain reflectometer to the interminated end of the coaxial cable;
   connecting a display means to the output of the reflectometer;
   trolling the unconnected end of the coaxial cable in a medium whose temperature profile it is desired to obtain;
   energizing the time-domain reflectometer so that it sends pulses intermittently along the cable;
   energizing the display means so that it displays the output of the reflectometer;
   with the result that the reflected signals from the cable are displayed on the display means as a function of the temperature profile along the cable.

5. The method according to claim 4, wherein the display means is a cathode-ray tube.

6. The method according to claim 4, wherein the display means is a pen chart recorder.

* * * * *